United States Patent [19]
Frutschi

[11] Patent Number: 5,884,470
[45] Date of Patent: Mar. 23, 1999

[54] METHOD OF OPERATING A COMBINED-CYCLE PLANT

[75] Inventor: Hansulrich Frutschi, Riniken, Switzerland

[73] Assignee: Asea Brown Boveri AG, Baden, Switzerland

[21] Appl. No.: 831,016

[22] Filed: Mar. 31, 1997

[30] Foreign Application Priority Data

Apr. 22, 1996 [DE] Germany .................. 196 15 911.3

[51] Int. Cl.[6] ........................... F02C 3/30; F02C 6/18
[52] U.S. Cl. ............................ 60/39.05; 60/39.182
[58] Field of Search .................. 60/39.05, 39.17, 60/39.182, 39.3, 39.53, 39.55, 728

[56] References Cited

U.S. PATENT DOCUMENTS

| | | | |
|---|---|---|---|
| 4,519,207 | 5/1985 | Okabe et al. | 60/39.182 |
| 4,928,478 | 5/1990 | Maslak | 60/39.05 |
| 5,564,269 | 10/1996 | Briesch | 60/39.05 |
| 5,727,377 | 3/1998 | Fetescu et al. | 60/39.05 |
| 5,761,896 | 6/1998 | Dowdy et al. | 60/39.05 |

FOREIGN PATENT DOCUMENTS

| | | |
|---|---|---|
| 0304827A1 | 3/1989 | European Pat. Off. . |
| 0321809B1 | 6/1989 | European Pat. Off. . |
| 0439754A1 | 8/1991 | European Pat. Off. . |
| 0619133A1 | 10/1994 | European Pat. Off. . |
| 0646705A1 | 4/1995 | European Pat. Off. . |
| 4427987A1 | 2/1996 | Germany . |

*Primary Examiner*—Louis J. Casaregola
*Attorney, Agent, or Firm*—Burns, Doane, Swecker & Mathis, L.L.P.

[57] ABSTRACT

In a method of operating a combined-cycle plant, which essentially comprises a gas-turbine group, a waste-heat steam generator (14) and a steam cycle equipped with a steam turbine (17), the gas-turbine group being operated according to sequential combustion (4, 9), at least one steam quantity (50) proportioned by a control (C) is extracted at a suitable point in terms of pressure in order to increase the operational output of the steam turbine (17). This steam quantity (50) is then fed to the gas-turbine group at a suitable point in such a way that, to maintain the output thus induced, at least the metering (D, E) of a fuel quantity (5, 10) at at least one combustion chamber (4, 9) is influenced.

5 Claims, 1 Drawing Sheet

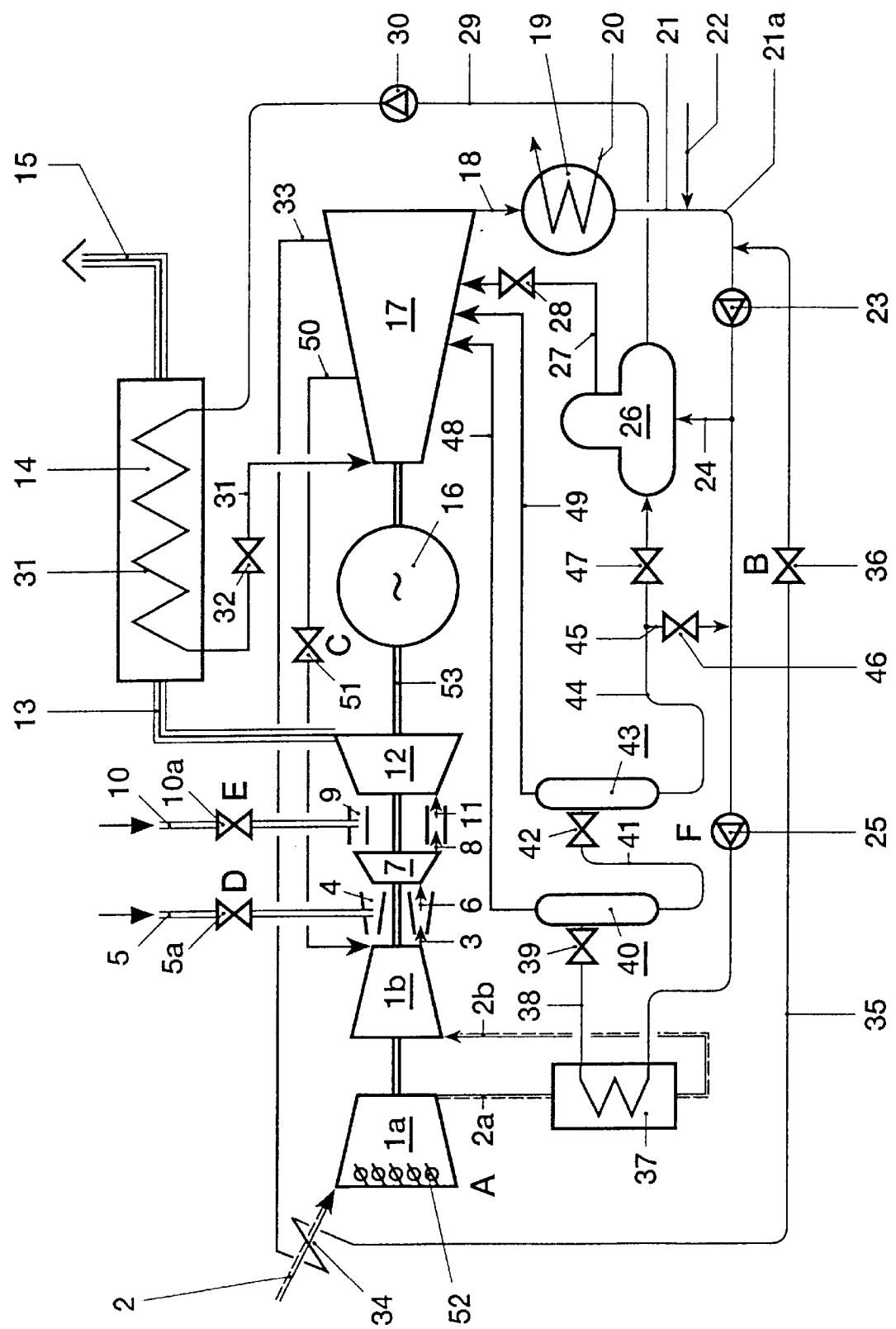

METHOD OF OPERATING A COMBINED-CYCLE PLANT

BACKGROUND OF THE INVENTION

1. Field of the Invention

The present invention relates to a method of operating a combined-cycle plant.

2. Discussion of Background

A modern combined-cycle plant according to the prior art is normally operated with the following control actions: the control members to be activated by the output or speed controller, namely compressor guide-row adjustment, intake-air preheating and steam injection with a steam quantity from the waste-heat steam generator, cause thermodynamic changes in the cycle, such as those of mass flow and pressure ratio. These changes in turn require an adaptation of the fuel quantities. This is done via appropriate control members which initiate fuel metering. If there is an intercooler in the compressor system, the cooling-water quantity can be changed via cooling-water metering in order to optimize the aerodynamic ratios of the sectional compressors.

Thus, for example, partial closing of the compressor guide rows and/or preheating of the intake air results in a decrease in the cycle air flow, which decrease brings about a decrease in the pressure ratio on account of the absorption principle of the turbine. In order to now prevent a temperature rise in the two combustion chambers, the fuel quantities must be reduced. This is expediently done by using the two parameters which can easily be recorded in a reliable manner—the turbine outlet temperature and the pressure at the outlet of the compressor system. However, direct recording of the hot-gas temperatures and the outlet temperature of the high-pressure turbine is actually problematic on account of the very high temperature level prevailing there.

Conversely, when the compressor guide rows are opened further, the two fuel quantities to the combustion chambers must be increased, which takes place via the same control mechanism as before. However, the increase in output thus achieved is based on an increased combustion-chamber and turbine mass flow, which involves an increase in the pressure ratio. The reduction brought about by this in the turbine outlet temperature on the low-pressure side only marginally reduces the steam production increased by the increasing mass flow, so that the useful output increases approximately in proportion to the increase in the air quantity delivered by the compressor. A greater increase in the operational output of the steam turbine is therefore not possible.

SUMMARY OF THE INVENTION

Accordingly, one object of the invention as defined in the claims, in the case of a method of the type mentioned at the beginning, is to provide a novel control method which brings about an increase in the operational output, this while simultaneously maximizing the efficiency and minimizing the pollutant emissions.

By an extraction of a certain steam quantity from the steam turbine at a suitable pressure point and by injection of the same into the gas-turbine process at a suitable point, the gas-turbine output is increased to a substantially greater extent than the steam-turbine output decreases. An increase in output of 10–15% can thus be achieved overall.

The injection of steam should preferably be effected upstream of the burner of the high-pressure combustion chamber, admixing of the same to the fuel being in balance thermodynamically. Since the injected steam is brought to the temperature level of the hot gas prepared in this combustion chamber, which of course requires an additional fuel quantity, steam is additionally produced in the waste-heat steam generator. It is certainly true that this increase in output involves a slight decrease in the efficiency of the combined-cycle plant, since higher-grade latent heat is lost in the stack than would be the case in the condenser of the steam turbine. However, since the steam to be injected into the gas turbine is extracted from the steam turbine at a suitable point in terms of pressure, it does not bring about a proportionate reduction in the overall steam-turbine output.

The abovementioned slight reduction in the efficiency can be compensated for as follows: the introduction of an intercooler, by subdividing the compressor into at least two sectional compressors, increases the output of the gas turbine and thus also that of the combined-cycle plant. Whereas the efficiency of the gas turbine increases if a favorable cycle pressure ratio is selected and if the two sectional pressure ratios of the compressor sections are favorably subdivided in terms of pressure, this efficiency decreases slightly with respect to the combined cycle. This is because the fuel energy proportion which is lost in the intercooler is not present in the waste-heat steam generator for the steam production. However, this fall in efficiency can be arrested by the cooling-water quantity in the intercooler being kept as small as possible, and thus hot pressurized water develops which is partly converted into steam in an evaporation cascade, which steam is then directed into the steam turbine and performs work there.

The inlet temperature to the second compressor part can therefore be influenced by the change in the cooling-water quantity so that, at operating points differing from the nominal point, the two compressor sections can be adjusted so that their efficiencies are maximized, which in turn is reflected in the overall efficiency of the combined-cycle plant.

Advantageous and expedient further developments of the achievement of the object according to the invention are defined in the further claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single figure shows a circuit of a combined-cycle plant whose gas-turbine group is constructed for sequential combustion.

DESCRIPTION OF THE PREFERRED EMBODIMENTS

Referring now to the drawing, wherein like reference numerals designate identical or corresponding parts throughout the several views, all elements not essential for directly understanding the invention are omitted, and the direction of flow of the media is indicated by arrows, the figure shows a combined-cycle plant which consists of a gas-turbine group, essentially comprising the items 1a-12, 16, 53, a waste-heat steam generator 14 and a steam cycle. The gas-turbine group, which can be operated as an autonomous unit, consists of a compressor unit, which will be explained in more detail further below, a first combustion chamber 4 arranged downstream of the compressor unit, a first turbine 7 arranged downstream of this combustion chamber 4, a second combustion chamber 9 arranged downstream of the first turbine 7, and a second turbine 12 arranged downstream of the second combustion chamber 9. Said turbomachines 1, 7, 12 have a common rotor shaft 53 which is coupled by a coupling (not apparent) to a generator 16. This rotor shaft 53 is preferably mounted on two bearings (not shown) which are preferably arranged on the head side of the compressor unit and downstream of the second turbine 12. In this case, the compressor unit, for example in order to increase the specific output, is subdivided into two sectional compressors 1a, 1b having an intercooler 37 connected in between, the first sectional compressor 1a being equipped with a compressor guide-row adjustment 52. The intake air 2 passes through an intake-air preheater 34 before it is precompressed in the first compressor 1a. This precompressed air 2a is then directed through the intercooler 37 already mentioned in order to then flow as intercooled, precompressed air 2b into the second compressor 1b. After its final compression, the compressed air 3 preferably flows into a casing (not shown) which includes the compressor outlet and the first turbine 7. Also accommodated in this casing is the first combustion chamber 4, which is preferably designed as a continuous annular combustion chamber and into which the compressed air 3 flows. The compressed air for the operation of the first combustion chamber 4 may of course be provided from an air accumulator system (not shown). On the head side, the annular combustion chamber 4 has a number of burners (not shown in more detail) distributed over the periphery, which burners are responsible for the combustion. The feeding of the fuel 5 preferably takes place via a ring main (not shown), at least one control member 5a being provided here. Diffusion burners may be used here per se. For reducing the pollutant emissions, in particular as far as the NOx emissions are concerned, and for increasing the efficiency, it is advantageous to provide an arrangement of premix burners according to U.S. Pat. No. 4,932,861 to Keller et al., the patent subject matter from this publication being an integral part of this description; in addition, this assertion also applies to the type of fuel feed described there and the composition of the combustion air, which can be enriched, for example, with a recycled flue gas. With regard to the type of feed and the composition of the combustion air, this consideration also applies to the second combustion chamber 9. As far as the arrangement of these premix burners in the peripheral direction of the annular combustion chamber 4 is concerned, such an arrangement may differ from the conventional configuration of burners of the same size if required; premix burners of different size and of the same or different configuration may be used instead, this preferably in the sense of a subdivision between pilot and main burners. The annular combustion chamber 4 may of course consist of a number of individual tubular combustion spaces which if need be are also arranged in an inclined annular shape, sometimes also helically, around the rotor shaft 53. This annular combustion chamber 4, irrespective of its design, is arranged geometrically in such a way that it has virtually no effect on the rotor length. The resulting advantages from such a disposition will be dealt with in more detail further below. The hot gases 6 from this annular combustion chamber 4 are admitted to the first turbine 7 arranged directly downstream, the thermally expanding action of which on the hot gases 6 is deliberately kept to a minimum, i.e. this turbine 7 will accordingly consist of no more than one to two rows of moving blades. In such a turbine 7 it will be necessary to provide pressure compensation at the end faces for the purpose of stabilizing the axial thrust. The hot exhaust gases 8 partially expanded in turbine 7 and directly flowing into the second combustion chamber 9 are at quite a high temperature for the reasons explained; preferably, it is to be designed on an operationally specific basis such that it is certainly still around 1000° C. This second combustion chamber 9 preferably has the form of a continuous, annular, axial or quasi-axial cylinder; it may of course also consist of a number of axially, quasi-axially or helically arranged and self-contained combustion spaces. As far as the configuration of the annular combustion chamber 9 consisting of a single combustion space is concerned, a plurality of fuel lances 10 are disposed in the peripheral direction of this annular cylinder, in which case they may of course be connected to one another via a ring main (not shown). This fuel feed is also provided with at least one control member 10a. This combustion chamber 9 has no burners per se in the conventional sense: the combustion of the fuel 10 injected into the hot exhaust gases 8 coming from the turbine 7 takes place here by self-ignition, if indeed the temperature level permits such a mode of operation. Starting from the assumption that the combustion chamber 9 is operated with a gaseous fuel, that is, for example, natural gas, the temperature of the hot exhaust gases 8 from the turbine 7 must be around 1000° C. for self-ignition, and this of course must also be the case during part-load operation, a factor which plays a causal role in the design of this turbine 7. In order to ensure the operational reliability and a high efficiency in the case of a combustion chamber designed for self-ignition, it is of the utmost importance that the flame front remains locally stable. For this purpose, a number of vortex generators (not shown in the figure), disposed in the peripheral direction, are provided in this combustion chamber 9, preferably on the inner and outer wall, which vortex generators are arranged in the direction of flow preferably upstream of the fuel lances 10. The task of these vortex generators is to produce vortices into which the fuel is then fed and which then induce a stabilizing backflow zone further downstream, analogous to that from the premix burners in the annular combustion chamber 4. Since this combustion chamber 9, on account of the axial arrangement and its overall length, is a high-velocity combustion chamber, the average velocity of which is greater than about 60 m/s, the vortex-producing elements, that is, the vortex generators, must be designed to conform to the flow. On the inflow side, these elements are to preferably consist of a tetrahedral shape having inclined surfaces with respect to the inflow. The vortex-producing elements, as already mentioned, may be placed on either the outer surface or the inner surface of the combustion chamber 9, or may act at either location. The inclined surfaces between the outer and the inner vortex-producing elements are preferably arranged in mirror image in such a way that the cross section of flow in the combustion chamber 9 undergoes a backflow-producing expansion downstream of this location in the region of the injection of the fuel 10. The vortex-producing elements may of course also be displaced axially relative to one another. The outflow-side surface of the vortex-producing elements is directed essentially perpendicularly toward the inner wall so that the intended backflow zone can appear starting from this location. With regard to the specific configuration of the vortex generators, reference is made to publication U.S. Pat. No. 5,518,311 to Althaus et al., which is an integral part of this description. However, the self-ignition in the combustion chamber 9 must also continue to be assured for various fuels in the transient load ranges as well as in the part-load range of the gas-turbine group, i.e. auxiliary measures must be provided which ensure the self-ignition in the combustion chamber 9 even if the temperature of the hot exhaust gases 8 in the region of the injection of the fuel 10 should possibly vary. In order to ensure this, a small quantity of another fuel having a lower ignition temperature may be added to the main fuel. Fuel oil, for example, is very suitable here as "auxiliary fuel". The liquid auxiliary fuel, appropriately injected, performs the task of acting so to speak as a fuse and initiates self-ignition in the combustion chamber 9 even if the hot exhaust gases 8 from the first turbine 7 should be at a temperature below the desired optimum level. This measure of providing fuel oil for ensuring self-ignition certainly always proves to be especially appropriate when the gas-turbine group is operated at reduced load. Furthermore, this measure is a decisive factor in enabling the combustion chamber 9 to have a minimum axial length. The short overall length of the combustion chamber 9, the action of the vortex generators considered for forming the mixture and stabilizing the flame and the continual guarantee of self-ignition are responsible for causing the combustion to be effected very quickly, and the dwell time of the fuel in the region of the hot flame front remains minimal. An effect resulting herefrom which is directly measurable from the combustion relates to the NOx emissions, which are at the same time minimized in such a way that they are now no longer relevant. Furthermore, this initial situation enables the location of the combustion to be clearly defined, which is reflected in optimized cooling of the structures of this combustion chamber 9. The hot gases 11 prepared in the combustion chamber 9 are then admitted to a second turbine 12 arranged downstream. The thermodynamic characteristics of the gas-turbine group may be designed in such a way that the exhaust gases 13 from the second turbine 12 still have so much thermal potential to thus operate a waste-heat steam generator 14 arranged downstream. As already pointed out in the description of the annular combustion chamber 4, this annular combustion chamber 4 is arranged geometrically in such a way that it has virtually no effect on the rotor length. Furthermore, it could be established that the second combustion chamber 9 occupies a minimum length between the outflow plane of the first turbine 7 and the inflow plane of the second turbine 12. Furthermore, since the expansion of the hot gases 6 in the first turbine 7, for reasons explained, takes place over few rows of moving blades, a single-shaft, compact gas-turbine group can be provided. It is of advantage for increasing the efficiency of the gas-turbine group if a small diffuser (not apparent in the figure) is provided in front of the second combustion chamber 9. The total pressure loss in the entire system could therefore be reduced. It can be shown from the conventional diffuser design diagrams that large recovery rates of the dynamic pressure can be achieved even at a minimum length of the diffuser. As explained above, the compressor stages 1a, 1b may be equipped with intercooling. In order not to alter the basic geometric conception of the gas-turbine group, as shown in the figure, when establishing the basis for such intercooling, the intercooler 37 may be integrated in the stator casing, preferably right in the direction of flow of the compressor stages. The cooling in this intercooler 37 takes place indirectly or directly. In the case of direct intercooling, this may be effected, for example, by a unit whose operation is designed for the evaporation of the injected water. Thus a configuration is obtained such that conventional connecting lines to an intercooler placed outside the stator casing and from this intercooler back through the stator casing to the next compressor stage are completely dispensed with.

As already explained, the exhaust gases 13 from the second turbine 12 flow through the waste-heat steam generator 14 and are then diverted as flue gases 15 via a stack. The waste-heat steam generator 14 shown here generates live steam 31. Of course, waste-heat steam generators, which can work according to a mixed-pressure system and accordingly provide steam in several quality stages, may also be provided.

The live steam 31 produced in the waste-heat steam generator 14 flows via a control member 32 into a steam turbine 17, the shaft of which is also coupled to the generator 16 already mentioned. The expanded steam 18 from the steam turbine 17 then flows through a condenser 19, which is operated with an appropriate cooling medium 20. The resulting condensate 21 is supplemented with additional water 22 if required, which largely results in cooling water 21a, which, delivered by a feed pump 23, then flows in the direction of the intercooler 37 of the compressor system, a first quantity 24 of this cooling water 21a first of all being directed into a mixing preheater 26. The rest is then directed via a further feed pump 25 into said intercooler 37. Steam 27 from the mixing preheater 26 flows via a control member 28 into the steam turbine 17 and performs work there. Feedwater 29 is also provided from this mixing preheater 26, which feedwater 29 flows via a feed pump 30 into the waste-heat steam generator 14 and is converted there into steam 31 by the heat-exchange process in order to be admitted to the steam turbine 17. Due to the cooling of the precompressed air 2a in the intercooler 37, hot pressurized water 38 develops from the cooling water 21a by corresponding quantity control, which pressurized water 38 is partly converted into steam 48, 49 in an evaporation cascade 40, 41, 43 equipped by control members 39, 42, which steam 48, 49 is directed into the steam turbine 17 at a suitable point. A third evaporation with said cascade takes place downstream of the second evaporation flask 43: a line 44 carries the remaining hot pressurized water via a control member 47 into the mixing preheater 26, a branch 45 with control member 46 carrying a cooling-water quantity upstream of this mixing preheater 26 into the other cooling-water line 21a. The steam discharge from said mixing preheater 26 has already been described further above. A steam quantity 33 is extracted from the steam turbine 17 at a suitable point in terms of pressure, which steam quantity 33 serves to preheat the intake air 2. After passing through this intake-air preheater 34, the condensate 35 is directed via a control member 36 into the cooling-water line 21a. A second steam quantity 50 from the steam turbine 17 is injected upstream of the first combustion chamber 4 of the gas-turbine group and participates in the production of hot gas, this steam injection substantially increasing the operational output of the combined-cycle plant, as already explained in more detail under the section "Summary of the Invention".

The plant is controlled at least via the following control members to be activated: the output and speed control takes place via a compressor guide-row control A, an intake preheating B at control member 36, and a steam injection C into the gas-turbine group at control member 51. The thermodynamic changes caused by this in the cycle, such as those of mass flow and pressure ratio, require in turn an adaptation of the fuel quantities D and E, which takes place by means of the control members 5a, 10a. In addition, for outputs below about 50% of the nominal output when compressor guide-row adjustment A and intake-air preheating B are modulated, the fuel meterings D and E are activated as primary control methods. To optimize the aerodynamic ratios of the sectional compressors 1a, 1b, cooling-water metering F is carried out at control member 25 upstream of the intercooler 37.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of operating a combined-cycle plant, the plant including a gas-turbine group having a compressor unit, a least one combustion chamber, and at least one gas turbine, a waste-heat steam generator connected to receive exhaust gas from the at least one gas turbine, a steam cycle having at least one steam turbine, and a generator driven by the at least one gas turbine and the at least one steam turbine, the method comprising the steps of:

generating a flow of pressurized steam in the waste-heat steam generator;

feeding the pressurized steam to the at least one steam turbine;

extracting a quantity of partially expanded steam from the at least one steam turbine;

feeding the extracted steam to a combustion air flow in the gas turbine group upstream of the at least one gas turbine;

adjusting a quantity of fuel flow to the at least one combustion chamber for heating the extracted steam, wherein an output of the gas turbine group is increased by the heated extracted steam, and wherein the exhaust gases of the turbine group provide additional heat to the steam generator to increase a quantity of steam generated in the steam generator; and feeding the increased quantity of steam to the steam turbine for an increase in output of the steam turbine.

2. The method as claimed in claim 1, wherein the gas turbine group further includes an intercooler arranged between stages of the compressor unit, the method including the steps of controlling an amount of the extracted steam by adjusting a compressor guide-row, by controlling a degree of preheating of intake air to the compressor, and by adjusting a flow quantity of cooling water to the intercooler.

3. The method as claimed in claim 1, wherein the extracted steam is introduced into the gas-turbine group downstream of the compressor unit.

4. The method as claimed in claim 1, wherein the gas-turbine group includes a first combustion chamber upstream of a first turbine, and a second combustion chamber connected downstream of the first turbine and upstream of a second turbine, wherein the method includes the step of introducing exhaust gas from the first turbine into the second combustion chamber for combustion.

5. The method as claimed in claim 4, wherein the exhaust gases from the first turbine enter into the second combustion chamber at a temperature level which lies above the self-ignition temperature of a fuel injected into the second combustion chamber.

* * * * *